(No Model.)

C. DARRAH, Jr.
APPARATUS FOR SECURING LENGTHS OF FLEXIBLE HOSE TOGETHER.

No. 367,790. Patented Aug. 9, 1887.

Witnesses
H. A. Lamb.
Joseph Backer

Inventor
Charles Darrah Jr.
By his Attorney

UNITED STATES PATENT OFFICE.

CHARLES DARRAH, JR., OF HEATON MERSEY, COUNTY OF LANCASTER, ENGLAND.

APPARATUS FOR SECURING LENGTHS OF FLEXIBLE HOSE TOGETHER.

SPECIFICATION forming part of Letters Patent No. 367,790, dated August 9, 1887.

Application filed August 7, 1886. Serial No. 210,346. (No model.) Patented in England January 27, 1886, No. 1,219.

*To all whom it may concern:*

Be it known that I, CHARLES DARRAH, Jr., a subject of the Queen of Great Britain and Ireland, residing at Heaton Mersey, in the county of Lancaster, England, have invented certain new and useful Improvements in Hose-Couplings, (patented in Great Britain and Ireland by Letters Patent No. 1,219, dated the 27th day of January, 1886,) of which the following is a specification.

This invention relates to "detachable" couplings or securing devices for flexible hose; and it consists, first, in a novel combination of parts whereby each hose end is detachably secured in a peculiar manner, and, secondly, in a novel coupling device the parts of which are readily cast and are so united as to preclude their accidental separation whether in use or not.

A sheet of drawings accompanies this specification as part thereof.

Figure 1:
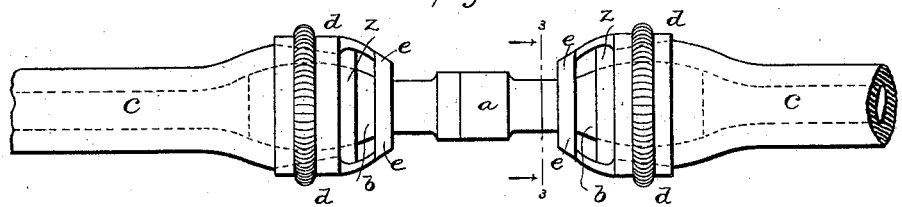
Figure 2:
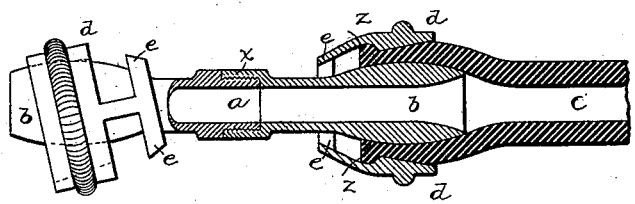
Figure 3:
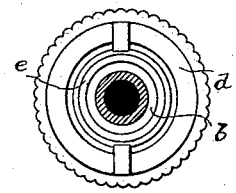

Figure 1 of these drawings is an elevation of my said coupling device applied to two hose ends. Fig. 2 is an elevation thereof detached from one hose end and partly in section; and Fig. 3 represents a cross-section on the line 3 3, Fig. 1.

Like letters of reference indicate like parts in all the figures.

In carrying out my invention I employ a rigid (metallic) bushing-tube, $a$, the extremities of which are bulged outward to a larger diameter and then gradually diminished down to the ordinary internal diameter of the hose to which they are fitted. Over the bulbs $b$ so formed I force the respective ends of two lengths of hose, $c$, which are to be connected together, and then, in order to secure the same in position, I draw back upon the outside of each of the hose ends a metallic outer ring, $d$, (which has been previously mounted upon the bushing-tube $a$,) the bore of which tapers toward mid-length of the bushing-tube, which thus tightens itself upon and contracts the expanded hose end around the posterior portion of the bulb, while the extremity of the hose end is free to expand behind the body of the ring, as represented at $z$ in Figs. 1 and 2, so as to resist their separation. The ring is thus kept in position on the hose end, and while in such position effectually prevents the hose being withdrawn from the bushing-tube, no matter what pressure is exerted by the fluid passing through.

I make the bushing-tube $a$ with a screw-joint, $x$, at mid-length, as illustrated in Fig. 2, and, when the rings $d$ have been placed upon their respective parts thereof, I soft-solder the joint, and thus prevent its becoming unscrewed. In this way I prevent the rings $d$ becoming lost or removed from the bushing-tube, their smaller extremities, in the form of appended stop-rings $e$, being made too small to pass over the bulbs $b$. At the same time I provide for casting all the parts in substantially complete shape, so that the device may be cheaply manufactured. The only screw-thread is in the soldered joint $x$, where there is no wear, and said stop-rings $e$, so appended, do not interfere with the expansion of the extremities of the hose, as aforesaid. By retracting the rings by hand the hose ends may be released and detached, as represented at the left-hand end of Fig. 2.

It will be apparent that by having a similar bulb affixed at the extremity of a bib-tap or hose-connection of any description, and provided with a similar outer ring, as aforesaid, a hose-pipe or other flexible tube could be readily and effectually secured thereto in like manner.

I am aware that it is old, broadly considered, to combine a bushing-tube having a bulb at each end and a pair of outer rings having clamping-bores, which taper toward mid-length of the tube, for uniting two pieces of flexible hose, and that it is not broadly new to make such a coupling device of cast metal, nor to secure its parts against accidental separation; but heretofore the bushing-tube has invariably been made in one part, and the construction of the remainder thus complicated, and such devices have heretofore lacked the expansion-spaces provided in my device between the body of each clamping-ring and its appended stop-ring, which materially aid in rendering the simplified device a secure coupling.

Having thus described my said improvement in hose-couplings, I claim as new and of my invention and desire to protect by Letters Patent of the United States under this specification—

1. The combination, with a flexible hose, of a rigid bushing-tube inserted within an end thereof and having a bulb by which said end is expanded, and an outer ring having a tapering clamping-bore opposed to the posterior portion of said bulb, and an appended stop-ring connected with the body of said outer ring only at short portions of its circumference, whereby lateral expansion-spaces are formed between said bore and said stop-ring, substantially as hereinbefore specified.

2. In an improved coupling device for flexible hose, a pair of outer rings having tapering clamping-bores and appended stop-rings, the latter being connected with the bodies of said outer rings only at short portions of their circumferences, whereby lateral expansion-spaces are formed between said bores and said stop-rings, in combination with a two-part bushing-tube having a bulb at each extremity thereof to coact with said bores and stop-rings, and a soldered screw-joint at mid-length, which provides for assembling the parts and unites the same against accidental separation, substantially as hereinbefore specified.

In testimony whereof I affix my signature in presence of two witnesses.

CHARLES DARRAH, Jr.

Witnesses:
JOHN G. WILSON,
JOHN SLATER.